United States Patent
Nakamura et al.

(10) Patent No.: US 11,066,563 B2
(45) Date of Patent: Jul. 20, 2021

(54) RADIATION CURABLE INK

(71) Applicant: Seiko Epson Corporation, Tokyo (JP)

(72) Inventors: Kiyoshi Nakamura, Matsumoto (JP); Toru Saito, Yamagata (JP); Naoki Koike, Matsumoto (JP); Toshiyuki Yoda, Matsumoto (JP)

(73) Assignee: Seiko Epson Corporation

( * ) Notice: Subject to any disclaimer, the term of this patent is extended or adjusted under 35 U.S.C. 154(b) by 48 days.

(21) Appl. No.: 16/583,350

(22) Filed: Sep. 26, 2019

(65) Prior Publication Data

US 2020/0102465 A1  Apr. 2, 2020

(30) Foreign Application Priority Data

Sep. 27, 2018 (JP) .............. JP2018-181332

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *C09D 11/30* | (2014.01) |

(52) U.S. Cl.
CPC ............ *C09D 11/101* (2013.01); *C09D 11/30* (2013.01)

(58) Field of Classification Search
CPC ...... C09D 11/322; C09D 11/30; C09D 11/101
USPC .................................. 522/1; 520/1
See application file for complete search history.

(56) References Cited

U.S. PATENT DOCUMENTS

| | | | |
|---|---|---|---|
| 7,825,168 B2 | 11/2010 | Nakamura | |
| 9,056,986 B2 | 6/2015 | Kagose et al. | |
| 9,469,771 B2 | 10/2016 | Mizutaki et al. | |
| 9,738,800 B2 | 8/2017 | Nakano et al. | |
| 2020/0277504 A1* | 9/2020 | Koike | C08F 220/301 |

FOREIGN PATENT DOCUMENTS

| | | |
|---|---|---|
| JP | 2007-077211 A | 3/2007 |
| JP | 2012-007107 A | 1/2012 |
| JP | 2012-126885 A | 7/2012 |
| JP | 2012-162688 A | 8/2012 |
| JP | 2012-236966 A | 12/2012 |
| JP | 2013-203873 A | 10/2013 |
| JP | 2015-061921 A | 4/2015 |

* cited by examiner

*Primary Examiner* — Jessica Whiteley
(74) *Attorney, Agent, or Firm* — Harness, Dickey & Pierce, P.L.C.

(57) ABSTRACT

A radiation curable ink comprises a compound represented by the following Formula (I):

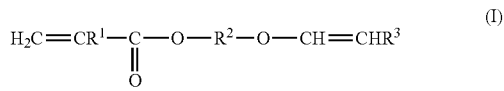

a compound represented by the following Formula (II):

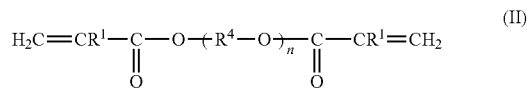

and a compound represented by the following Formula (III):

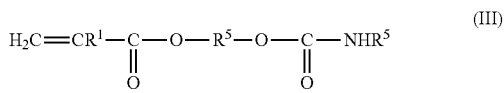

4 Claims, No Drawings

RADIATION CURABLE INK

The present application is based on, and claims priority from, JP Application Serial Number 2018-181332, filed Sep. 27, 2018, the disclosure of which is hereby incorporated by reference herein in its entirety.

BACKGROUND

1. Technical Field

The present disclosure relates to a radiation curable ink.

2. Related Art

Ink jet recording methods perform recording by discharging small droplets of ink through fine nozzles such that the ink adheres to recording media. The ink jet recording methods have characteristics that high-resolution and high-quality images can be recorded at high speed. The ink jet recording methods have numerous factors to consider, including stability in recording and the quality of resulting images. In addition, examinations not only for improving the performance of ink jet recording apparatuses and also for ink to be used are actively being conducted.

In recent years, in order to form images having, for example, high water resistance, solvent resistance, and scratch resistance on the surfaces of recording media, radiation curable ink, which cures by irradiation with radiation, for ink jet recording has been studied.

For example, JP A-2015-061921 discloses a photocurable ink jet ink composition including a multifunctional acrylate-based monomer and a urethane (meth)acrylate oligomer. In addition, this patent literature also describes the composition has good reactivity and gives a printed product with low viscosity and excellent flexibility.

SUMMARY

However, since the composition described in the above-mentioned patent literature includes a urethane (meth)acrylate oligomer having two or more (meth)acrylic functional groups, the coating film may have too high hardness to give insufficient drawability, and the adhesion with a recording medium may become insufficient. Accordingly, in a post-process, such as cutting or punching, performed with a converter (label or package printing), floating of the coating film or cracking of the coating film may occur at the cutting end of the recording medium with low adhesion.

An aspect of a radiation curable ink according to the present disclosure includes a compound represented by the following Formula (I):

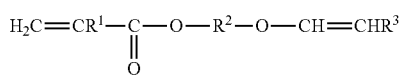

(in Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms); a compound represented by the following Formula (II):

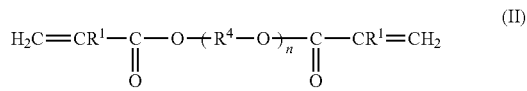

(in Formula (II), $R^1$ is a hydrogen atom or a methyl group, $R^4$ is a divalent organic residue having 2 to 5 carbon atoms, and n is an integer of 1 to 3); and a compound represented by the following Formula (III):

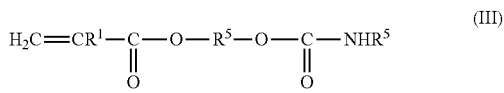

(in Formula (III), $R^1$ is a hydrogen atom or a methyl group, $R^5$ is a divalent organic residue having 2 to 5 carbon atoms, $R^6$ is an alkyl group having 1 to 10 carbon atoms or a hydroxyalkyl group having 1 to 10 carbon atoms, and m is an integer of 1 to 3).

In one aspect of the radiation curable ink, the ink may include a monofunctional (meth)acrylate compound having an aromatic ring skeleton.

In any aspect of the radiation curable ink, the ink may include a penta- or higher functional (meth)acrylate compound.

In any aspect of the radiation curable ink, the content of the compound represented by Formula (III) may be 1.0 mass % or more and 10.0 mass % or less based on the total amount of the radiation curable ink.

DESCRIPTION OF EXEMPLARY EMBODIMENTS

Embodiments of the present disclosure will now be described. The embodiments described below describe examples of the present disclosure. The present disclosure is not limited to the following embodiments and includes various modifications implemented within a scope not changing the gist of the present disclosure. Note that not all of the compositions described below are essential compositions of the present disclosure.

1. Radiation Curable Ink

The radiation curable ink according to the present embodiment includes: a compound represented by the following Formula (I):

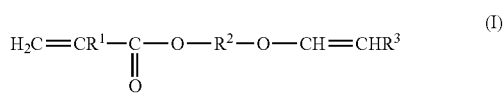

(in Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms); a compound represented by the following Formula (II):

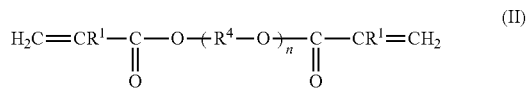

(in Formula (II), $R^1$ is a hydrogen atom or a methyl group, $R^4$ is a divalent organic residue having 2 to 5 carbon atoms, and n is an integer of 1 to 3); and a compound represented by the following Formula (III):

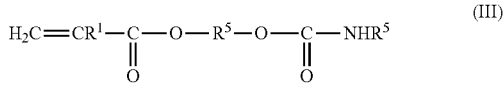

(in Formula (III), $R^1$ is a hydrogen atom or a methyl group, $R^5$ is a divalent organic residue having 2 to 5 carbon atoms, $R^6$ is an alkyl group having 1 to 10 carbon atoms or a hydroxyalkyl group having 1 to 10 carbon atoms, and m is an integer of 1 to 3). These compounds will be sequentially described below.

1.1. Compound Represented by Formula (I)

The compound represented by Formula (I) is a compound belonging to vinyl ether group-containing (meth)acrylic acid ester. In the present specification, the compounds represented by Formula (I) do not fall under the category of a multifunctional (meth)acrylate monomer described later.

The radiation curable ink can have good curing properties by containing a compound represented by Formula (I).

In the compounds represented by Formula (I), the divalent organic residue having 2 to 20 carbon atoms represented by $R^2$ may be an optionally substituted linear, branched, or cyclic alkylene group having 2 to 20 carbon atoms, an optionally substituted alkylene group having 2 to 20 carbon atoms and having an oxygen atom of an ether bond and/or an ester bond in the structure, or an optionally substituted divalent aromatic group having 6 to 11 carbon atoms. Furthermore, among these groups, the organic residue may be an alkylene group having 2 to 6 carbon atoms, such as an ethylene group, an n-propylene group, an isopropylene group, and a butylene group, or an oxyalkylene group having 2 to 9 carbon atoms and having an oxygen atom of an ether bond in the structure, such as an oxyethylene group, an oxy-n-propylene group, an oxyisopropylene group, and an oxybutylene group, from the viewpoint of enhancing the flexibility of the cured product.

In the compounds represented by Formula (I), the monovalent organic residue having 1 to 11 carbon atoms represented by $R^3$ may be an optionally substituted linear, branched, or cyclic alkyl group having 1 to 10 carbon atoms or an optionally substituted aromatic group having 6 to 11 carbon atoms. Among these groups, the organic residue may be an alkyl group having 1 or 2 carbon atoms, i.e., a methyl group or an ethyl group, or an aromatic group having 6 to 8 carbon atoms, such as a phenyl group and a benzyl group, because the viscosity of the radiation curable ink can be easily decreased.

In the present specification, when the organic residue is an optionally substituted group, examples of the substituent are classified into a carbon-containing group and a carbon-free group. When the substituent is a carbon-containing group, the carbon atom or atoms are counted in the number of the carbon atoms of the organic residue. Examples of the carbon-containing group include, but not limited to, a carboxyl group and an alkoxy group. Examples of the carbon-free group include, but not limited to, a hydroxy group and a halo group.

Examples of the compound represented by Formula (I) include, but not limited to, 2-vinyloxyethyl (meth)acrylate, 3-vinyloxypropyl (meth)acrylate, 1-methyl-2-vinyloxyethyl (meth)acrylate, 2-(2-vinyloxyethoxy)ethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(2-vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, polyethylene glycol monovinyl ether (meth)acrylate, and polypropylene glycol monovinyl ether (meth)acrylate.

Among these compounds, from the viewpoint of a low viscosity, a high flash point, and excellent curing properties, the compound represented by Formula (I) may be selected from 2-(vinyloxyethoxy)ethyl (meth)acrylate, i.e., 2-(vinyloxyethoxy)ethyl acrylate and 2-(vinyloxyethoxy)ethyl methacrylate, and may be 2-(vinyloxyethoxy)ethyl acrylate. 2-(Vinyloxyethoxy)ethyl (meth)acrylate includes 2-(2-vinyloxyethoxy)ethyl (meth)acrylate and 2-(1-vinyloxyethoxy)ethyl (meth)acrylate. 2-(Vinyloxyethoxy)ethyl acrylate includes 2-(2-vinyloxyethoxy)ethyl acrylate (hereinafter also referred to as "VEEA") and 2-(1-vinyloxyethoxy)ethyl acrylate.

The content of the compound represented by Formula (I) is within a range of 5.0 mass % or more and 50.0 mass % or less based on the total mass (100 mass %) of the radiation curable ink and can be within a range of 10.0 mass % or more and 45.0 mass % or less, a range of 12.0 mass % or more and 30 mass % or less, or a range of 15.0 mass % or more and 25.0 mass % or less. When the content is within the above-mentioned range, the ink has excellent curing properties and discharge stability, and also a coating film having excellent viscosity, scratch resistance, and extensibility can be easily formed.

The compounds represented by Formula (I) may be used alone or in combination of two or more thereof.

In the present specification, the term "(meth)acrylate" refers to either or both of acrylate and methacrylate, and the term "(meth)acrylic" refers to either or both of acrylic and methacrylic. The term "oligomer" refers to a low polymer that is di- or multimer obtained by polymerization of a monomer and has a weight-average molecular weight of 10000 or less. Incidentally, in the present specification, a value obtained by mass spectrometry measurement is adopted as the weight-average molecular weight.

1.2. Compound Represented by Formula (II)

The radiation curable ink of the embodiment includes a compound represented by Formula (II). The compound represented by Formula (II) is a compound belonging to glycol-based di(meth)acrylate. The radiation curable ink can impart flexibility to the cured product of the ink by containing a compound represented by Formula (II).

In the compounds represented by Formula (II), the divalent organic residue having 2 to 5 carbon atoms represented by $R^4$ may be an optionally substituted linear, branched, or cyclic alkylene group having 2 to 5 carbon atoms or an optionally substituted alkylene group having 2 to 5 carbon atoms and having an oxygen atom of an ether bond and/or an ester bond in the structure. Furthermore, among these groups, the organic residue may be an alkylene group having 2 to 4 carbon atoms, such as an ethylene group, an n-propylene group, an isopropylene group, and a butylene group, or an oxyalkylene group having 2 to 5 carbon atoms and having an oxygen atom of an ether bond in the structure, because the flexibility of the cured product can be easily enhanced.

Furthermore, in the compounds represented by Formula (II), the divalent organic residue having 2 to 5 carbon atoms represented by $R^4$ may be an optionally substituted linear, branched, or cyclic alkylene group having 2 to 5 carbon atoms, from the viewpoint of ease of handling and availability. Furthermore, among these groups, the organic residue may be an alkylene group having 2 to 4 carbon atoms, such as an ethylene group, an n-propylene group, an isopropylene group, and a butylene group.

When the organic residue is an optionally substituted group, examples of the substituent are classified into a carbon-containing group and a carbon-free group. When the substituent is a carbon-containing group, the carbon atom or atoms are counted in the number of the carbon atoms of the organic residue. Examples of the carbon-containing group include, but not limited to, a carboxyl group and an alkoxy group. Examples of the carbon-free group include, but not limited to, a hydroxy group and a halo group.

In addition, in Formula (II), n is an integer of 1 to 3 and can be 2 or 3.

Examples of the compound represented by Formula (II) include, but not limited to, ethylene glycol di(meth)acrylate, diethylene glycol di(meth)acrylate, triethylene glycol di(meth)acrylate, propylene glycol di(meth)acrylate, dipropylene glycol di(meth)acrylate, tripropylene glycol di(meth)acrylate, 1,4-butanediol di(meth)acrylate, 1,3-butanediol di(meth)acrylate, dibutylene glycol di(meth)acrylate, tributylene glycol di(meth)acrylate, tetrabutylene glycol di(meth)acrylate, 1,5-pentanediol di(meth)acrylate, 1,4-pentanediol di(meth)acrylate, 1,3-pentanediol di(meth)acrylate, dipentylene glycol di(meth)acrylate, tripentylene glycol di(meth)acrylate, cyclopentanediol di(meth)acrylate, neopentyl glycol di(meth)acrylate, and 2-hydroxy-1,3-di(meth)acryloyloxypropane.

The content of the compound represented by Formula (II) is within a range of 10.0 mass % or more and 50.0 mass % or less based on the total mass (100 mass %) of the radiation curable ink and can be within a range of 10.0 mass % or more and 40.0 mass % or less, a range of 15.0 mass % or more and 35.0 mass % or less, or a range of 20.0 mass % or more and 30.0 mass % or less. When the content is within the above-mentioned range, the ink has excellent curing properties and discharge stability, and also a coating film having excellent viscosity, scratch resistance, and extensibility can be easily formed.

The compounds represented by Formula (II) may be used alone or in combination of two or more thereof.

1.3. Compound Represented by Formula (III)

The radiation curable ink of the embodiment includes a compound represented by Formula (III). The compound represented by Formula (III) is a compound belonging to urethane bond-containing mono(meth)acrylate. In addition, the compound represented by Formula (III) can also be referred to as monofunctional urethane bond-containing (meth)acrylate.

The radiation curable ink can impart more excellent flexibility, drawability, and adhesion with a recording medium to the cured product of the ink by containing the compound represented by Formula (III). These functions are probably caused by containing the urethane bond, but the details of the mechanism are not necessarily clear.

In the compounds represented by Formula (III), the divalent organic residue having 2 to 5 carbon atoms represented by $R^5$ may be an optionally substituted linear, branched, or cyclic alkylene group having 2 to 5 carbon atoms or an optionally substituted alkylene group having 2 to 5 carbon atoms and having an oxygen atom of an ether bond and/or an ester bond in the structure. Furthermore, among these groups, the organic residue may be an alkylene group having 2 to 4 carbon atoms, such as an ethylene group, an n-propylene group, an isopropylene group, and a butylene group, or an alkylene group having 2 to 5 carbon atoms and having an oxygen atom of an ether bond in the structure, such as an oxyethylene group, an oxy-n-propylene group, an oxyisopropylene group, and an oxybutylene group.

In the compounds represented by Formula (III), the divalent organic residue having 2 to 5 carbon atoms represented by $R^5$ may be an optionally substituted linear, branched, or cyclic alkylene group having 2 to 5 carbon atoms. Furthermore, among these groups, the organic residue may be an alkylene group having 2 to 4 carbon atoms, such as an ethylene group, an n-propylene group, an isopropylene group, and a butylene group, because the viscosity of the ink can be easily decreased.

In addition, in the compounds represented by Formula (III), when $R^6$ is an alkyl group having 1 to 10 carbon atoms, the group is a linear, branched, or cyclic alkyl group having 1 to 10 carbon atoms. In addition, when $R^6$ is a hydroxyalkyl group having 1 to 10 carbon atoms, the group is a linear, branched, or cyclic alkyl group having 1 to 10 carbon atoms in which one or more hydrogen atoms on one or more carbon atoms are substituted with hydroxy groups.

Examples of the group represented by $R^6$ include a methyl group, an ethyl group, an n-propyl group, an isopropyl group, a butyl group, a pentyl group, a hexyl group, a heptyl group, an octyl group, a nonyl group, and a decyl group; structural isomers thereof; and groups having their cyclic, bicyclic, and/or spiro rings. In addition, examples of the group represented by $R^6$ include groups in which one or more hydrogen atoms on one or more carbon atoms of the above-mentioned groups are substituted with hydroxy groups.

From the viewpoint of further improving the flexibility of the cured product and the adhesion with the recording medium and the viewpoint of ease of availability and manufacturing, the group represented by $R^6$ may be a methyl group, an ethyl group, an n-propyl group, an isopropyl group, a butyl group, a pentyl group, a hexyl group, a heptyl group, an octyl group, a nonyl group, or a decyl group; structural isomers thereof; or a group in which a hydrogen atom on the terminal carbon atom thereof is substituted with a hydroxy group.

Examples of the compound represented by Formula (III) include, but not limited to, compounds prepared by reaction of hydroxyalkyl (meth)acrylate and alkyl monoisocyanate and compounds prepared by reaction of hydroxyalkyl (meth)acrylate and hydroxyalkyl monoisocyanate. More specifically, the examples include 2-(butylcarbamoyloxy)ethyl acrylate, which is a compound prepared by reaction of hydroxyethyl acrylate and n-butyl isocyanate (n-butyl-1-monoisocyanate).

The content of the compound represented by Formula (III) is within a range of 0.3 mass % or more and 40.0 mass % or less based on the total mass (100 mass %) of the radiation curable ink and can be within a range of 0.5 mass % or more and 30.0 mass % or less, a range of 0.5 mass % or more and 25.0 mass % or less, or a range of 1.0 mass % or more and 10.0 mass % or less. When the content is within the above-mentioned range, a coating film having excellent drawability and also adhesion can be formed.

1.4. Other Components 1.4.1. Monofunctional (Meth)Acrylate Compound Having Aromatic Ring Skeleton The radiation curable ink of the embodiment may contain a monofunctional (meth)acrylate compound having an aromatic ring skeleton.

The viscosity of the radiation curable ink can be decreased by containing a monofunctional (meth)acrylate compound having an aromatic ring skeleton in some cases. In addition, the solubility of a polymerization initiator can be increased by containing a monofunctional (meth)acrylate compound having an aromatic ring skeleton, which may impart better curing properties to the radiation curable ink. These functions are probably caused by rigidity in the molecular order of the aromatic ring.

Examples of the monofunctional (meth)acrylate compound having an aromatic ring skeleton include phenoxyethyl (meth)acrylate, 2-hydroxy-3-phenoxypropyl (meth)acrylate, benzyl (meth)acrylate, phenoxydiethylene glycol (meth)acrylate, nonylphenoxyethyl (meth)acrylate, and alkoxylated phenoxyethyl (meth)acrylate.

Among these compounds, in order to reduce the viscosity and odor, the compound may be at least one of phenoxyethyl (meth)acrylate and isobornyl (meth)acrylate, for example, phenoxyethyl (meth)acrylate, in particular, phenoxyethyl acrylate (PEA).

Compatibility with an additive, such as a polymerization initiator, and the curing properties of the radiation curable ink are improved by including a monofunctional (meth)acrylate compound having an aromatic ring skeleton, which may suppress occurrence of, for example, curing wrinkles.

Among these compounds, phenoxyethyl (meth)acrylate, 2-hydroxy-3-phenoxypropyl (meth)acrylate, or benzyl (meth)acrylate may be contained from the viewpoint of curing properties or the solubility of the initiator, and phenoxyethyl acrylate may be contained from the viewpoint of enhancing the compatibility with an additive, such as a polymerization initiator, and further decreasing the viscosity and odor.

The above-mentioned monofunctional (meth)acrylate compounds having an aromatic ring skeleton may be used alone or in combination of two or more thereof.

When the monofunctional (meth)acrylate compound having an aromatic ring skeleton is blended, the content thereof may be 5.0 mass % or more and 50.0 mass % or less based on the total mass (100 mass %) of the radiation curable ink and can be 10.0 mass % or more and 40.0 mass % or less or 10.0 mass % or more and 35.0 mass % or less. When the content is within the above-mentioned range, the compatibility with an additive, such as a polymerization initiator, can be further enhanced, and the toughness, heat resistance, and chemical resistance of the cured product may be improved.

1.4.2. Penta- or Higher Functional (Meth)Acrylate Compound

The radiation curable ink of the embodiment may further include a penta- or higher functional (meth)acrylate compound. The penta- or higher functional (meth)acrylate compound has five or more (meth)acryloyl groups per molecule. When the radiation curable ink of the embodiment includes a penta- or higher functional (meth)acrylate compound, the ink can have very good curing properties. Furthermore, from the viewpoint of further excellent curing properties, the compound may have a hydroxy group in the molecule. These functions are probably caused by the large number of functional groups relative to the molecular weight (functional group density).

Examples of penta-functional (meth)acrylate compound include sorbitol penta(meth)acrylate, dipentaerythritol penta(meth)acrylate, ditrimethylolpropane penta(meth)acrylate, propionic acid-modified dipentaerythritol penta(meth)acrylate, propionic acid-modified tripentaerythritol penta(meth)acrylate, and propionic acid-modified tetrapentaerythritol penta(meth)acrylate; and ethylene oxide (EO) adducts thereof and propylene oxide (PO) adducts thereof.

Examples of hexa-functional (meth)acrylate compound include sorbitol hexa(meth)acrylate, ditrimethylolpropane hexa(meth)acrylate, dipentaerythritol hexa(meth)acrylate, tripentaerythritol hexa(meth)acrylate, phosphazene alkylene oxide-modified hexa(meth)acrylate, caprolactone-modified dipentaerythritol hexa(meth)acrylate, propionic acid-modified tripentaerythritol hexa(meth)acrylate, and propionic acid-modified tetrapentaerythritol hexa(meth)acrylate; and EO adducts thereof and PO adducts thereof.

Examples of hepta- or higher functional (meth)acrylate compound include tripentaerythritol hepta(meth)acrylate, propionic acid-modified tripentaerythritol hepta(meth)acrylate, propionic acid-modified tetrapentaerythritol hepta(meth)acrylate, tripentaerythritol octa(meth)acrylate, propionic acid-modified tetrapentaerythritol octa(meth)acrylate, tetrapentaerythritol nona(meth)acrylate, propionic acid-modified tetrapentaerythritol nona(meth)acrylate, tetrapentaerythritol deca(meth)acrylate, pentapentaerythritol undeca(meth)acrylate, and pentapentaerythritol dodeca(meth)acrylate; and EO adducts thereof and PO adducts thereof.

In addition, the ink may contain (meth)acrylate having a dipentaerythritol skeleton. Examples of the (meth)acrylate having a dipentaerythritol skeleton include dipentaerythritol hexa(meth)acrylate and dipentaerythritol penta(meth)acrylate. In such a case, the radiation curable ink has a relatively low viscosity and good curing properties.

Multiple types of penta- or higher functional (meth)acrylate compounds may be used. When a penta- or higher functional (meth)acrylate compound is used, the content thereof is 1.0 mass % or more and 20.0 mass % or less based on the total mass (100 mass %) of the radiation curable ink and can be 3.0 mass % or more and 10.0 mass % or less or 5.0 mass % or more and 10.0 mass % or less. When the content is within the above-mentioned range, the ink can have significantly good curing properties.

Among the above-mentioned compounds, in particular, when dipentaerythritol hexa(meth)acrylate (in particular, dipentaerythritol hexaacrylate) is used, the content thereof is 1.0 mass % or more and 10.0 mass % or less based on the total mass (100 mass %) of the radiation curable ink and can be 3.0 mass % or more and 10.0 mass % or less or 5.0 mass % or more and 10.0 mass % or less. When the content is within the above-mentioned range, the curing properties are especially excellent, and the viscosity of the radiation curable ink can be sufficiently lowered.

1.4.3. Other Polymerizable Compound

The radiation curable ink of the embodiment may include a polymerizable compound (hereinafter, referred to as "other polymerizable compound"), in addition to a compound represented by Formula (I), a compound represented by Formula (II), a compound represented by Formula (III), a monofunctional (meth)acrylate compound having an aromatic ring skeleton, and a penta- or higher functional (meth)acrylate compound.

As the other polymerizable compound, various known monofunctional and multifunctional, such as difunctional, trifunctional, and tetrafunctional, monomers and oligomers can be used. Examples of the monomer include unsaturated carboxylic acids, such as (meth)acrylic acid, itaconic acid, crotonic acid, isocrotonic acid, and maleic acid, and salts and esters thereof; urethanes; amides and anhydrides thereof; acrylonitrile; styrene; and various unsaturated polyesters, unsaturated polyethers, unsaturated polyamides, and unsaturated urethanes.

Examples of the oligomer include oligomers formed from the above-mentioned monomers, such as linear acrylic oligomers; epoxy (meth)acrylate; oxetane (meth)acrylate; aliphatic urethane (meth)acrylate; aromatic urethane (meth) acrylate; and polyester (meth)acrylate.

Examples of other monofunctional monomer or multifunctional monomer may include N-vinyl compounds. Examples of the N-vinyl compound include N-vinylformamide, N-vinylcarbazole, N-vinylacetamide, N-vinylpyrrolidone, N-vinylcaprolactam, and acryloylmorpholine; and derivatives thereof.

Among the other polymerizable compounds, esters of tetra- or lower functional (meth)acrylic acid, i.e., tetra- or lower functional (meth)acrylates will now be described with specific examples.

Examples of the monofunctional (meth)acrylate include, but not limited to, isoamyl (meth)acrylate, stearyl (meth) acrylate, lauryl (meth)acrylate, octyl (meth)acrylate, decyl (meth)acrylate, isomyristyl (meth)acrylate, isostearyl (meth) acrylate, 2-ethylhexyl diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, tetrahydrofurfuryl (meth)acrylate, isobornyl (meth)acrylate, 2-hydroxyethyl (meth)acrylate, 2-hydroxypropyl (meth)acrylate, lactonemodified flexible (meth)acrylate, t-butylcyclohexyl (meth) acrylate, dicyclopentanyl (meth)acrylate, and dicyclopentenyloxyethyl (meth)acrylate.

Examples of the difunctional (meth)acrylate include, but not limited to, 1,6-hexanediol di(meth)acrylate, 1,9-nonanediol di(meth)acrylate, 1,10-decanediol di(meth)acrylate, 2,4-dimethyl-1,5-pentanediol di(meth)acrylate, ethoxylated cyclohexanemethanol di(meth)acrylate, oligoethylene glycol di(meth)acrylate, polytetramethylene glycol di(meth) acrylate, polyethylene glycol di(meth)acrylate, 2-ethyl-2-butyl-butanediol di(meth)acrylate, hydroxypivalate neopentyl glycol di(meth)acrylate, hydroxypiperic acid ester neopentyl glycol di(meth)acrylate, EO (ethylene oxide)-modified bisphenol A di(meth)acrylate, PO (propylene oxide)-modified bisphenol A di(meth)acrylate, bisphenol F polyethoxy di(meth)acrylate, polypropylene glycol di(meth) acrylate, oligopropylene glycol di(meth)acrylate, 2-ethyl-2-butylpropanediol di(meth)acrylate, propoxylated ethoxylated bisphenol A di(meth)acrylate, tricyclodecane di(meth) acrylate, tricyclodecanedimethylol di(meth)acrylate, and an acrylated amine compound obtained by reaction of 1,6-hexanediol di(meth)acrylate and an amine compound.

Examples of the trifunctional (meth)acrylate include, but not limited to, trimethylolpropane tri(meth)acrylate, trimethylolethane tri(meth)acrylate, trimethylolpropane alkylene oxide-modified tri(meth)acrylate, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri(meth) acryloyloxyethyl)isocyanurate, hydroxypivalaldehydemodified dimethylolpropane tri(meth)acrylate, sorbitol tri (meth)acrylate, glycerol propoxy tri(meth)acrylate, propoxylated trimethylolpropane tri(meth)acrylate, ethoxylated glycerol tri(meth)acrylate, and caprolactone-modified trimethylolpropane tri(meth)acrylate.

Examples of the tetrafunctional (meth)acrylate include, but not limited to, pentaerythritol tetra(meth)acrylate, sorbitol tetra(meth)acrylate, ditrimethylolpropane tetra(meth) acrylate, propionic acid dipentaerythritol tetra(meth)acrylate, and ethoxylated pentaerythritol tetra(meth)acrylate.

The monofunctional (meth)acrylate among the other polymerizable compounds may have at least one skeleton selected from saturated alicyclic skeletons and unsaturated alicyclic skeletons. When the other polymerizable compound is a monofunctional (meth)acrylate having the above-mentioned skeleton, the viscosity of the radiation curable ink can be decreased. Examples of the monofunctional (meth)acrylate having a saturated alicyclic skeleton include isobornyl (meth)acrylate, t-butylcyclohexyl (meth)acrylate, and dicyclopentanyl (meth)acrylate. Examples of the monofunctional (meth)acrylate having an unsaturated alicyclic skeleton include dicyclopentenyloxyethyl (meth)acrylate. Examples of the difunctional (meth)acrylate having a saturated alicyclic skeleton include tricyclodecane di(meth)acrylate and tricyclodecanedimethylol di(meth)acrylate.

The above-mentioned other polymerizable compounds may be used alone or in combination of two or more thereof. When the above-mentioned other polymerizable compound is contained, the content thereof may be 0.5 mass % or more, based on the total mass (100 mass %) of the radiation curable ink, and can be 5 mass % or more and 40 mass % or less, but is not limited thereto.

1.4.4. Other Materials

The radiation curable ink of the embodiment may contain a polymerization initiator, a color material, and other materials.

1.4.4. (1) Polymerization Initiator

The polymerization initiator that can be contained in the radiation curable ink of the embodiment is used for curing the ink present on a surface of a recording medium through photopolymerization by irradiation of light, such as ultraviolet light, to form a print. The use of ultraviolet (UV) light as the irradiation light is excellent in safety and can suppress the cost of the light source lamp. Although any polymerization initiator that generates active species, such as radicals and cations, by the energy of light (UV light) and initiates polymerization of the polymerizable compound can be used without limitation, a photoradical polymerization initiator or a photocationic polymerization initiator can be used, in particular, a photoradical polymerization initiator can be used.

Examples of the photoradical polymerization initiator include aromatic ketones, acylphosphine oxide compounds, aromatic onium salt compounds, organic peroxides, thio compounds (such as thioxanthone compounds and thiophenyl group-containing compounds), hexaaryl biimidazole compounds, ketoxime ester compounds, borate compounds, azinium compounds, metallocene compounds, active ester compounds, compounds having carbon-halogen bonds, and alkylamine compounds.

Among these compounds, in particular, at least one of acylphosphine oxide compounds and thioxanthone compounds may be used because they can impart good curing properties to the ink, and an acylphosphine oxide compound and a thioxanthone compound can be used in combination.

Examples of the photoradical polymerization initiator include acetophenone, acetophenone benzyl ketal, 1-hydroxycyclohexylphenylketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Among these compounds, in particular, 2,4,6-trimethylbenzoyl-diphenyl-phosphine oxide, bis(2,4,6-trimethylbenzoyl)-phenylphosphine oxide, and 2,4-diethylthioxanthone can be used.

Examples of commercial products of the photoradical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one}, IRGACURE 907 (2-methyl-1-(4-methyithiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morphonyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octadione,1-[4-(phenylthio)-,2-(O-benzoyloxime)]), IRGACURE OXE 02 (ethanone,1-[9-ethyl-6-(2-methylbenzoyl)-9H-carbazol-3-yl]-,1-(O-acetyloxime)), IRGACURE 754 (mixture of 2-[2-oxo-2-phenylacetoxyethoxy]ethyl oxyphenylacetate and 2-(2-hydroxyethoxy) ethyl oxyphenylacetate) (each trade name manufactured by BASF SE), KAYACURE DETX-S (2,4-diethylthioxanthone) (trade name manufactured by Nippon Kayaku Co., Ltd.), Lucirin TPO, LR8893, and LR8970 (each trade name manufactured by BASF SE), and Ubecryl P36 (trade name manufactured by UCB S.A.).

The polymerization initiators may be used alone or in combination of two or more thereof.

The content of the polymerization initiator may be 1.0 mass % or more and 20.0 mass % or less based on the total mass (100 mass %) of the radiation curable ink for improving the curing properties of the ink and avoiding non-dissolving of the polymerization initiator and coloring due to the polymerization initiator.

Although the addition of the polymerization initiator may be omitted by using a polymerizable compound that can polymerize by heat or light, the start of polymerization can be easily adjusted by using a polymerization initiator.

When the polymerization initiator includes an acylphosphine oxide compound, the content thereof may be 7.0 mass % or more and 15.0 mass % or less based on the total mass (100 mass %) of the radiation curable ink and can be 7.0 mass % or more and 15.0 mass % or less, 8.0 mass % or more and 15.0 mass % or less, or 10.0 mass % or more and 14.0 mass % or less. When the content is within the above-mentioned range, the radiation curable ink can have further excellent curing properties, and the solubility of the initiator in the radiation curable ink can be enhanced.

When the polymerization initiator includes a thioxanthone compound, the content thereof may be 0.5 mass % or more and 4.0 mass % or less based on the total mass (100 mass %) of the radiation curable ink and can be 1.0 mass % or more and 3.0 mass % or less. When the content is within the above-mentioned range, the radiation curable ink can have further excellent curing properties.

1.4.4. (2) Color Material

The radiation curable ink of the embodiment may further include a color material. As the color material, at least one of a pigment and a dye can be used.

Pigment

In the embodiment, the use of a pigment as the color material can improve the light resistance of the radiation curable ink. The pigment may be an inorganic pigment or an organic pigment.

As the inorganic pigment, carbon blacks (C.I. Pigment Black 7), such as Furnace Black, Lamp Black, Acetylene Black, and Channel Black, iron oxide, and titanium oxide can be used.

Examples of the organic pigment include azo pigments, such as insoluble azo pigments, condensed azo pigments, azo lakes, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye-type chelates and acidic pigment-type chelates); dye lakes (basic dye-type lakes and acidic dye-type lakes); nitro pigments; nitroso pigments; aniline black; and daylight fluorescent pigments.

Further specifically, examples of the carbon black used as a black ink include No. 2300, No. 900, MCF88, No. 33, No. 40, No. 45, No. 52, MA7, MA8, MA100, and No. 2200B (each trade name manufactured by Mitsubishi Chemical Corporation), Raven 5750, Raven 5250, Raven 5000, Raven 3500, Raven 1255, and Raven 700 (each trade name manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each trade name manufactured by Cabot JAPAN K.K.), Color Black FW1, Color Black FW2, Color Black FW2V, Color Black FW18, Color Black FW200, Color BlackS150, Color Black S160, Color Black S170, Printex 35, Printex U, Printex V, Printex 140U, Special Black 6, Special Black 5, Special Black 4A, and Special Black 4 (each trade name manufactured by Degussa-Huls AG).

Examples of the pigment used in a white ink include C.I. Pigment White 6, 18, and 21, and metal compounds such as metal oxides, barium sulfate, and calcium carbonate. Examples of the metal oxide include titanium dioxide, zinc oxide, silica, alumina, and magnesium oxide.

Examples of the pigment used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of the pigment used in a cyan ink include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Examples of the pigment other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The pigments may be used alone or in combination of two or more thereof.

When the pigment is used, the average particle diameter of the pigment may be 300.0 nm or less and can be 50.0 nm or more and 200.0 nm or less. When the average particle diameter is within the above-mentioned range, the radiation curable ink has further excellent reliability in, for example, discharge stability and dispersion stability, and can form images with excellent image quality. Here, the average particle diameter of a pigment in the present specification is measured by dynamic light scattering.

Dye

In the embodiment, as the color material, a dye can be used. As the dye, an acidic dye, a direct dye, a reactive dye, or a basic dye can be used without limitation. Examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The dyes may be used alone or in combination of two or more thereof. A dye and a pigment may be used in combination. The content of the color material may be 0.5 mass % or more and 10 mass % or less based on the total mass (100 mass %) of the radiation curable ink because excellent color reproductivity is obtained.

1.4.4. (3) Others

The radiation curable ink of the embodiment may further include a dispersant. When the radiation curable ink of the embodiment includes a pigment, the ink may further include a dispersant for providing better pigment dispersibility. The dispersant is not particularly limited, and examples thereof include dispersants that are commonly used for preparing pigment dispersions, such as polymer dispersants. Specifically, examples thereof include those whose main component is at least one selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. Examples of commercial products of the polymer dispersant include Discole series manufactured by Dai-ichi Kogyo Seiyaku Co., Ltd., Solsperse series (such as Solsperse 36000) manufactured by Lubrizol Corporation, and DISPERBYK series manufactured by BYK-Chemie GmbH.

The radiation curable ink of the embodiment may further include a slipping agent (surfactant) for providing further excellent scratch resistance. The slipping agent is not particularly limited. For example, as a silicone surfactant, polyester-modified silicone or polyether-modified silicone, in particular, polyether-modified polydimethyl siloxane or polyester-modified polydimethyl siloxane can be used. Specifically, for example, BYK-347, BYK-348, BYK-UV3500, 3510, 3530, and 3570 (each manufactured by BYK-Chemie Japan KK) can be used.

The radiation curable ink of the embodiment may further include a polymerization inhibitor. The storage stability of the radiation curable ink is improved by adding a polymerization inhibitor to the radiation curable ink. The polymerization inhibitor is not particularly limited. For example, at least one selected from the group consisting of phenol compounds, hydroquinone compounds, and quinone compounds can be used. Specifically, examples of the polymerization inhibitor include hydroquinone, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol). As commercial products of the polymerization inhibitor, for example, IRGASTAB series UV10 and UV22 (each trade name manufactured by BASF SE) can be used.

The radiation curable ink of the embodiment may further include another additive (component). Such components can be, for example, known polymerization accelerator (such as a sensitizing dye), permeation enhancer, and other additives. Examples of other additives include a fixing agent, a fungicide, a preservative, an antioxidant, a UV absorber, a chelating agent, a pH adjuster, and a thickener.

1.5. Recording Medium

The radiation curable ink of the embodiment is discharged onto a recording medium by an ink jet recording method to provide a recorded matter. The recording medium may have a recording surface that absorbs liquid or may not have a recording surface that absorbs liquid. Accordingly, the recording medium is not particularly limited, and examples thereof include liquid-absorbing recording media, such as paper, films, and cloth, liquid low-absorbing recording media, such as printing paper, and liquid non-absorbing recording media, such as metals, glass, and polymers. However, the excellent effects of the radiation curable ink of the embodiment are significant when images are recorded on liquid low-absorbing or liquid non-absorbing recording media.

The liquid low-absorbing or liquid non-absorbing recording medium refers to a recording medium having a property of not absorbing liquid at all or hardly absorbing liquid. Quantitatively, the liquid low-absorbing or liquid non-absorbing recording medium refers to a "recording medium in which the amount of water absorbed within 30 msec$^{1/2}$ from the start of contact is 10 mL/m$^2$ or less in a Bristow method". The Bristow method is the most widely used for measuring the amount of liquid absorbed in a short time and is also adopted by Japan Technical Association of the Pulp and Paper Industry (JAPAN TAPPI). The details of the test method are described in the standard No. 51 "Paper and paperboard—Liquid absorbency test—Bristow method" of "JAPAN TAPPI paper pulp test method, 2000". In contrast, the liquid-absorbing recording medium refers to a recording medium other than the liquid non-absorbing and low-absorbing liquid media. In the present specification, the liquid low-absorbing property and liquid non-absorbing property may be simply referred to as low absorbency and non-absorbency, respectively.

Examples of the liquid non-absorbing recording medium include films and plates of plastics such as polyvinyl chloride, polyethylene, polypropylene, and polyethylene terephthalate (PET); plates of metals such as iron, silver, copper, and aluminum; metal plates and plastic films produced by deposition of such metals; and plates of alloys such as stainless steel and brass. Other examples include those prepared by coating a base material, such as paper, with plastic, those prepared by bonding a plastic film to a base material, such as paper, and plastic films not having an absorber layer (receptive layer). Examples of the "plastic" herein include polyvinyl chloride, polyethylene terephthalate, polycarbonate, polystyrene, polyurethane, polyethylene, and polypropylene.

Examples of the liquid low-absorbing recording medium include recording media provided with a coating layer (receptive layer) for receiving liquid on the surface, for example, recording media of which the base material is paper, e.g., printing paper such as art paper, coated paper, and matte paper; recording media of which the base material is a plastic film, e.g., those having a surface of polyvinyl chloride, polyethylene terephthalate, polycarbonate, polystyrene, polyurethane, polyethylene, polypropylene, or the like coated with a hydrophilic polymer; and those coated with particles, such as silica and titanium, together with a binder.

The liquid-absorbing recording medium is not particularly limited, and examples thereof include plain paper such as electrophotographic paper with high liquid permeability; ink jet paper (paper having an ink absorber layer made of silica particles or alumina particles or an ink absorber layer made of a hydrophilic polymer such as polyvinyl alcohol (PVA) or polyvinyl pyrrolidone (PVP) to be used exclusively for ink jet printing); and paper having relatively low liquid permeability to be used for general offset printing, such as art paper, coated paper, and cast paper.

The recording medium may be, for example, colorless and transparent, semitransparent, colored transparent, chromatic opaque, or achromatic opaque. In addition, the recording medium itself may be colored or semitransparent or transparent. In such a case, a white ink used as the background image ink can function as a concealing layer that conceals the color of the recording medium itself. In addition, for example, when a color image is recorded, the color developing property of the color image may be improved by recording a background image by a background image ink in the region where the color image is recorded.

1.6. Ink Jet Recording Method

The radiation curable ink of the embodiment can be used in an ink jet recording method. The ink jet recording method includes a discharge step of discharging a radiation curable ink onto a recording medium and a curing step of irradiating the radiation curable ink discharged in the discharge step with ultraviolet light (radiation) to cure the radiation curable ink. Thus, the radiation curable ink cured on the recording medium forms a coating film (cured product).

Discharge Step

The discharge step can use an ink jet recording apparatus. In order to discharge the radiation curable ink with good discharge stability, the radiation curable ink may have a viscosity at 20.0° C. of 1.5 mPa·s or more and 15.0 mPa·s or less and can have 1.5 mPa·s or more and 5.0 mPa·s or less or 1.5 mPa·s or more and 3.6 mPa·s or less. When the radiation curable ink adheres to a recording medium by an ink jet method, a predetermined adhesion region can be easily and efficiently formed on a recording medium.

Since the radiation curable ink of the embodiment tends to have a viscosity higher than those of aqueous ink compositions that are used in conventional ink jet inks, the viscosity is largely changed by fluctuations in temperature at the time of discharging. Accordingly, it is recommended to keep the ink temperature at the time of discharging as constant as possible.

Curing Step

Subsequently, in the curing step, the radiation curable ink discharged on the recording medium is cured by irradiation with ultraviolet light. On this occasion, if the radiation curable ink contains a sensitizing dye (polymerization accelerator) together with a polymerization initiator, the sensitizing dye in the system absorbs ultraviolet light and becomes an excited state and is brought into contact with the polymerization initiator to accelerate the decomposition of the polymerization initiator, which may allow the curing reaction to be achieved with higher sensitivity.

As the ultraviolet light source, for example, a mercury lamp or gas/solid laser is mainly used. As a light source for curing the radiation curable ink, for example, a mercury lamp or metal halide lamp can be used. In contrast, since a GaN-based semiconductor ultraviolet light emitting device, an ultraviolet light emitting diode (UV-LED), and an ultraviolet laser diode (UV-LD) have small sizes, long lives, and high efficiency, they can be used as light sources for radiation curable ink. Among these light sources, an UV-LED can be especially used.

Here, ultraviolet light having a light emission peak wavelength within a range of 350.0 nm or more and 420.0 nm or less, such as 365.0 nm or more and 405.0 nm or less, may be irradiated at an irradiation energy of 300.0 mJ/cm$^2$ or less, for example, 100.0 mJ/cm$^2$ or more and 250.0 mJ/cm$^2$ or less.

In this case, the radiation curable ink of the embodiment can cure with low energy and high speed because of its composition. The irradiation energy is calculated by multiplying the irradiation time by the irradiation intensity. The irradiation time can be shortened by changing the composition of the radiation curable ink in the embodiment. In such a case, the printing speed is increased.

At the same time, the irradiation intensity can also be decreased by changing the composition of the radiation curable ink in the embodiment. In such a case, a reduction in the size of the device and a reduction in the cost can be realized. The ultraviolet light irradiation at that time can be performed using an UV-LED. In such a case, the radiation curable ink includes a polymerizable compound that starts polymerization by irradiation with ultraviolet light having a wavelength within the above-mentioned range and a polymerization initiator that acts by irradiation with ultraviolet light having a wavelength within the above-mentioned range.

1.7. Ink Jet Recording Apparatus

The radiation curable ink of the embodiment can be used in an ink jet recording apparatus. The ink jet recording apparatus performs recording by a discharge step of discharging a radiation curable ink onto a recording medium and a curing step of irradiating the radiation curable ink discharged in the discharge step with ultraviolet light to cure the radiation curable ink. Thus, a coating film (cured film) of the radiation curable ink cured on the recording medium can be formed.

2. Example and Comparative Example

The present disclosure will now be more specifically described by examples, but the present disclosure is not limited to these examples. Hereinafter, the terms "part" and "%" are based on mass unless otherwise specified.

2.1. Preparation of Radiation Curable Ink

Radiation curable inks having different material compositions of Examples 1-1 to 1-5 and 2-1 to 2-3 and Comparative Examples 1 and 2 were prepared with the material compositions shown in Table 1. The radiation curable ink of each example was prepared by placing the materials shown in Table 1 in a container, mixing them to give the composition (unit: mass %) described in Table 1, and stirring the mixture with a high-speed water-cooling stirring machine.

diameter was medium, and the printed matter thickness was 6.0 μm. After the printing, the solid pattern image was cured by irradiation with 200.0 mJ/cm$^2$ of ultraviolet light having a wavelength of 395.0 nm and an irradiation intensity of 60.0 mW/cm$^2$ from the UV-LED of an UV irradiation device to form a recorded matter in which a solid pattern image was printed on a PET film.

The solid pattern image is an image in which dots have been recorded for all pixels, which are minimum recording unit regions defined by the recording resolution. The irradiation energy [mJ/cm$^2$] was determined by measuring the irradiation intensity [mW/cm$^2$] at the surface irradiated with light from a light source and multiplying the intensity by the irradiation duration time [s]. The irradiation intensity was measured with an ultraviolet intensity meter UM-10 and a light receiver UM-400 (each manufactured by Konica Minolta Sensing).

The adhesion of the PET film (Lumirror 125E20 (trade name), manufactured by Toray Industries, Inc.) and an image formed by the above-described solid printing was evaluated in accordance with JIS K-5600-5-6 (ISO 2409)

TABLE 1

|  |  | Example | | | | | Example | | | Comparative Example | |
| --- | --- | --- | --- | --- | --- | --- | --- | --- | --- | --- | --- |
|  |  | 1-1 | 1-2 | 1-3 | 1-4 | 1-5 | 2-1 | 2-2 | 2-3 | 1 | 2 |
| Ink composition | Urethane monoacrylate | 0.5 | 1.0 | 5.0 | 10.0 | 25.0 | 1.0 | 5.0 | 10.0 | — | — |
|  | VEEA | 20.0 | 20.0 | 20.0 | 20.0 | 20.0 | 20.0 | 20.0 | 20.0 | 20.0 | 20.0 |
|  | DPGA | 29.0 | 29.0 | 29.0 | 29.0 | 29.0 | 22.0 | 22.0 | 22.0 | 29.0 | 22.0 |
|  | PEA | 33.5 | 33.0 | 29.0 | 24.0 | 9.0 | 32.0 | 28.0 | 23.0 | 34.0 | 33.0 |
|  | 5- or higher functional | — | — | — | — | — | 8.0 | 8.0 | 8.0 | — | 8.0 |
|  | Initiator | 13.0 | 13.0 | 13.0 | 13.0 | 13.0 | 13.0 | 13.0 | 13.0 | 13.0 | 13.0 |
|  | Pigment | 3.0 | 3.0 | 3.0 | 3.0 | 3.0 | 3.0 | 3.0 | 3.0 | 3.0 | 3.0 |
|  | Dispersant | 1.0 | 1.0 | 1.0 | 1.0 | 1.0 | 1.0 | 1.0 | 1.0 | 1.0 | 1.0 |
|  | Total | 100 | 100 | 100 | 100 | 100 | 100 | 100 | 100 | 100 | 100 |
| Evaluation results | Adhesion | B | A | A | A | A | B | A | A | D | D |
|  | Drawability | C | C | B | A | A | C | B | A | D | D |
|  | Scratch resistance | A | A | B | C | C | A | A | B | A | A |
|  | Viscosity | A | A | A | C | D | A | A | C | A | A |
|  | Storage stability | A | A | A | B | B | A | A | B | A | A |

The materials shown in Table 1 are as follows.

Urethane monoacrylate: 2-(butylcarbamoyloxy)ethyl acrylate "manufactured by Eternal Materials Co., Ltd., trade name: EM2080"

VEEA: 2-(2-vinyloxyethoxy)ethyl acrylate

DPGA: dipropylene glycol diacrylate

PEA: phenoxyethyl acrylate

Penta- or higher functional: dipentaerythritol hexaacrylate

Initiator: IRGACURE 819 (trade name manufactured by BASF SE)

Pigment: C.I. Pigment Blue 15:3

Dispersant: Solsperse 36000 (trade name manufactured by Lubrizol Corporation)

2.2. Method for Evaluation 2.2.1. Adhesion

The radiation curable ink of each example was loaded into the corresponding nozzle array of an ink jet printer PX-G5000 (trade name manufactured by Seiko Epson Corporation). A solid pattern image (recording resolution 720× 720 dpi) was printed on a PET film (Lumirror 125E20 (trade name), manufactured by Toray Industries, Inc.) under ordinary temperature and ordinary pressure such that the ink dot (General Coating test method, Part 5: Mechanical properties of coating film, Section 6: Adhesion (Cross-cut method)).

The cross-cut method was performed as follows. A single blade cutting tool (a commercially available cutter) as a cutting tool and a guide for performing cutting at equal intervals with the single blade cutting tool were prepared. Six cuts were made in each recorded matter by placing the blade of the cutting tool to be perpendicular to the coating film. After making of the six cuts, the direction was changed by 90°, and six cuts were further made to be orthogonal to the already made cuts.

Subsequently, transparent adhesive tape (width: 25±1 mm) with a length of about 75 mm was attached to the portion cut in a lattice form of the coating film, and was sufficiently rubbed with a finger such that the coating film could be seen through the tape. Subsequently, within 5 minutes after the adhesion, the tape was reliably peeled off at an angle of approximately 60° in 0.5 to 1.0 seconds.

The evaluation criteria are as follows:

A: peeling is observed in less than 5% of the lattice,

B: peeling is observed in 5% or more and less than 35% of the lattice,

C: peeling is observed in 35% or more and less than 50% of the lattice, and

D: peeling is observed in 50% or more of the lattice.

The results of the evaluation are shown in Table 1.

2.2.2. Drawability

A thin film having a thickness of 10.0 μm was formed with a bar coater and was cured using an UV-LED lamp (wavelength: 395.0 nm, manufactured by SemiLEDs Corporation) The cured film was pulled by a tensile testing machine, and the elongation percentage at the time when a crack occurred was measured. The evaluation criteria are as follows:

A: 100% or more,

B: 80% or more and less than 100%,

C: 60% or more and less than 80%, and

D: less than 60%.

The results of the evaluation are shown in Table 1.

2.2.3. Scratch Resistance

A recorded matter of each example in which a solid pattern image was printed on a PET film was produced as in the "2.2.1. Adhesion" and was evaluated for scratch resistance using a Gakushin-type rubbing fastness tester AB-301 (manufactured by Tester Sangyo, Ltd.). In the evaluation method, cannequin as a fractioning material was placed on the surface of the coating film and rubbed the surface 100 reciprocations under a load of 100 g. The degree of scratches on the rubbed surface of the ink coating film was visually observed. The evaluation criteria are as follows:

A: no scratches were observed,

B: scratches occurred over an area of less than ⅓ of the surface area of the coating film, C: scratches occurred over an area of ⅓ or more and less than ⅔ of the surface area of the coating film, and D: scratches occurred over an area of ⅔ or more of the surface area of the coating film.

The results of the evaluation are shown in Table 1.

2.2.4. Viscosity

The viscosity (mPa·s) of the radiation curable ink of each example was measured at 20° C. with a rheometer (MCR-300, manufactured by Anton Paar GmbH). The evaluation criteria are as follows:

A: 3 mPa·s or more and 25 mPa·s or less,

B: higher than 25 mPa·s and 35 mPa·s or less,

C: higher than 35 mPa·s and 45 mPa·s or less, and

D: higher than 45 mPa·s.

The results of the evaluation are shown in Table 1.

2.2.5. Storage Stability

The radiation curable ink (24 mL) of each example was put in a 30-mL glass bottle and was shielded from light and left to stand at 70° C. for 8 days. The rate of increase in the viscosity of each ink after the standing was calculated by measuring the ink viscosity after the standing relative to the ink viscosity before the standing, and the storage stability of each ink was evaluated based on the rate. The evaluation criteria are as follows:

A: viscosity increase rate of less than 5%,

B: viscosity increase rate of 5% or more and less than 10%, and

C: viscosity increase rate of 10% or more.

The results of the evaluation are shown in Table 1.

2.3. Results of Evaluations

Examples, Comparative Examples, and Reference Examples revealed the followings.

The radiation curable inks containing urethane monoacrylate (the compound represented by Formula (III)) of Examples were all excellent in adhesion and drawability. It was also demonstrated that the effect can be sufficiently obtained by addition of 0.5 mass % of urethane monoacrylate. This probably allows the radiation curable ink of each Example to form a coating film that hardly causes floating or cracking at the cutting end in a post-process, such as cutting or punching, performed with a converter (label or package printing).

In contrast, the radiation curable inks not containing urethane monoacrylate of Comparative Examples were all insufficient in adhesion and drawability.

In each Example, the scratch resistance tended to be enhanced by using a penta- or higher functional monomer. Furthermore, although it was demonstrated that the viscosity is increased by addition of 25.0 mass % of urethane monoacrylate, in the ink jet method, discharge may be possible by, for example, increasing the temperature of the recording head.

The present disclosure is not limited to the above-described embodiments, and various modifications are possible. For example, the present disclosure includes compositions that are substantially the same as the compositions described in the embodiments (for example, a composition having the same function, method, and result, or a composition having the same purpose and effect). In addition, the present disclosure includes compositions in which nonessential parts of the compositions described in the embodiments are replaced. In addition, the present disclosure includes compositions having the same effects or capable of achieving the same purpose as those of the compositions described in the embodiments. In addition, the present disclosure includes compositions in which known technologies are added to the compositions described in the embodiments.

What is claimed is:

1. A radiation curable ink comprising:

a compound represented by Formula (I):

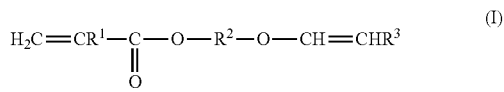

in Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms;

a compound represented by Formula (II):

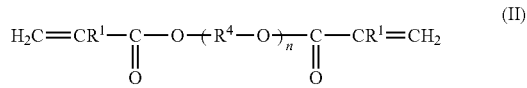

in Formula (II), $R^1$ is a hydrogen atom or a methyl group, $R^4$ is a divalent organic residue having 2 to 5 carbon atoms, and n is an integer of 1 to 3; and a compound represented by Formula (III):

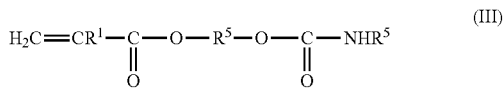

in Formula (III), $R^1$ is a hydrogen atom or a methyl group, $R^5$ is a divalent organic residue having 2 to 5 carbon atoms, $R^6$ is an alkyl group having 1 to 10 carbon atoms or a hydroxyalkyl group having 1 to 10 carbon atoms, and m is an integer of 1 to 3.

2. The radiation curable ink according to claim 1, further comprising a monofunctional (meth)acrylate compound having an aromatic ring skeleton.

3. The radiation curable ink according to claim 1, further comprising a penta- or higher functional (meth)acrylate compound.

4. The radiation curable ink according to claim 1, wherein a content of the compound represented by Formula (III) is 1.0 mass % or more and 10.0 mass % or less based on the total amount of the radiation curable ink.

\* \* \* \* \*